US 6,718,871 B1

(12) United States Patent
Fritz

(10) Patent No.: US 6,718,871 B1
(45) Date of Patent: Apr. 13, 2004

(54) PROVIDING PRINTING AND EMBOSSING DATA OVER A SINGLE DATA PATH

(75) Inventor: Terry M. Fritz, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/342,974

(22) Filed: Jan. 14, 2003

(51) Int. Cl.[7] .............................. B31F 1/07; B31F 5/16; B41J 1/54

(52) U.S. Cl. ...................... 101/3.1; 101/171; 101/382.1; 101/182; 400/127; 400/120.01

(58) Field of Search ...................... 101/3.1, 171, 382.1, 101/182; 400/127, 120.01; 399/2; 358/1.14, 1.15

(56) References Cited

U.S. PATENT DOCUMENTS

| | | | | |
|---|---|---|---|---|
| 4,096,578 A | * | 6/1978 | Malkemes | 358/1.14 |
| 5,025,399 A | * | 6/1991 | Wendt et al. | 358/1.18 |
| 5,231,450 A | * | 7/1993 | Daniels | 355/27 |
| 5,702,190 A | * | 12/1997 | Shimizu et al. | 400/341 |
| 5,902,056 A | | 5/1999 | Inui | 400/124.1 |
| 6,014,748 A | * | 1/2000 | Tushie et al. | 713/200 |
| 6,058,839 A | * | 5/2000 | Frazzitta | 101/401.1 |
| 6,484,780 B2 | * | 11/2002 | Ashley et al. | 156/540 |
| 6,513,710 B1 | * | 2/2003 | Haas | 235/380 |
| 6,602,378 B2 | * | 8/2003 | Lin | 156/277 |
| 2001/0053947 A1 | * | 12/2001 | Lenz et al. | 700/117 |

* cited by examiner

Primary Examiner—Andrew H. Hirshfeld
Assistant Examiner—Wasseem H. Hamdan

(57) ABSTRACT

A method of providing printing and embossing data includes transmitting print image data defining an image to be printed and emboss image data defining an image to be embossed, where the data is transmitted over a single data path to a common recipient processor.

25 Claims, 12 Drawing Sheets

PROVIDING PRINTING AND EMBOSSING DATA OVER A SINGLE DATA PATH

BACKGROUND

Embossing or emboss printing is a printing method in which characters, figures or other elements are formed as a raised surface in or on a print medium. Frequently, the raised surface of the embossed elements is also printed on, with ink or toner for example, to highlight the embossing. Embossed printing on a raised surface of a print medium adds dimension and tactility to the printed element.

Embossing is traditionally used to make printed matter more noticeable or impressive. For example, business cards, letterhead, invitation cards and greeting cards routinely have embossed elements, such as names, symbols, logos, etc. Other items that are traditionally embossed include trademarks, official seals and decorative images. Additionally, emboss printing is used to produce Braille writing and embossed graphs or the like in publications for visually impaired people that read by touch.

Traditionally, a number of methods have been used to create embossed elements on a print medium. One traditional method utilizes a male (120) and a female die (110), examples of which are illustrated in FIG. 1. The dies (110, 120) are used to mechanically press an embossed element into a print medium. The male (120) and the female (110) dies have a raised and a recessed pattern, respectively, of characters, graphics, Braille text or the like. A print medium is placed between the dies and mechanical pressure is applied in order to emboss the print medium with the image on the dies (110, 120).

This method is suitable for producing large amounts of high-quality embossed items. However, a precise milling machine and significant processing time are needed to form the male (120) and female (110) press dies. Thus, the production cost of the press dies can be substantial. Furthermore, the dies have a fixed geometry and produce the same embossing each time used. If a different embossing is desired, new dies will have to be produced and installed, which may be expensive and time consuming.

A second traditional method of forming an embossed image utilizes a foamable paper sheet. According to this method, an initial image pattern is formed on the foamable paper sheet with a black toner that is highly heat-absorptive. The foamable paper sheet carrying the toner image is then heated using, for example, infrared rays. The foamable paper sheet contains foamable microcapsules. As the temperature of the black toner rises, the adjacent foamable microcapsules produce bubbles, thus expanding the portions of the paper sheet in contact with the toner to form an embossed image.

It should be noted, however, that the production of the foamable paper containing foamable microcapsules requires a specifically constructed apparatus. Consequently, the production cost of the foamable paper may be prohibitive for some applications.

A third method of forming an embossed image utilizes an adhesive ink and resin. According to this method, an image to be embossed is printed on a print medium in a highly adhesive ink using an ordinary printer. The adhesive ink thus forms an initial printed image. Then, thermoplastic resin powder is dusted over the print medium. The thermoplastic resin powder adheres to the printed image formed of the highly adhesive ink. After removing the thermoplastic resin powder that has not collected in the adhesive ink of the printed image, heat is applied in order to dry the ink and to melt and completely fix the remaining thermoplastic resin powder in place over the printed image. Consequently, the resin powder forms an embossed image registered over the initial printed image.

There is some significant expense for the materials and equipment required, e.g., the resin powder, adhesive ink, printer and heating or curing apparatus. Consequently, this method may not be very suitable for use in small offices or homes where space and resources may be limited.

A similar method, that eliminates the need for specifically adhesive ink is illustrated in FIG. 2. As shown in FIG. 2, an electrophotographic printer or a laser printer is used as an initial image-forming unit to form an initial image on a print medium.

A corona charging device (212) creates a field of charges on the surface of a cylindrical drum (220). A modulated laser (210), directed through an optical system (214), writes a latent image in the field of charges applied to the drum (220). This latent image is developed with charged toner from a development device (216, 218). The charges in the toner cause the toner to adhere to the latent image on the drum (220). The toner image is then transferred from the drum (220) to a sheet of print medium (224) by a transfer roller (222).

Then, another part of the corona charging device (212) charges the print medium and electric charges are stored in the toner of the image already transferred to the print medium. Almost no electric charges are retained in the areas of the print medium (224) containing no toner. An electrostatic latent image is thus formed on the print medium that corresponds to the printed image rendered in toner.

Next, a thermoplastic resin powder is applied to the print medium by a resin applicator (228). The resin will only stick to the latent electrostatic image due to the electrostatic attractive force. The thickness of the thermoplastic resin powder is dependant upon the amount of electric charge of the electrostatic image and the particle size of the thermoplastic resin powder. Thereafter, the thermoplastic resin powder that does not adhere to the latent image is removed. An infrared heater (226) heats the remaining thermoplastic resin powder. The heated powder is fused to form an embossed image on the print medium (224) that is registered with the image printed in toner.

While this method is effective in producing embossed images in a relatively efficient manner, this process is limited to printing and embossing the same image. That is, it is difficult to emboss an image on the print medium that has not already been printed on the print medium with toner. Sometimes, it may be desired to emboss an image on the print medium without also printing that image.

If an image, separate from an embossed image is to be printed on the print medium, it is traditionally thought necessary to provide a separate downloading path for the data defining the image to be embossed. This added downloading path increases the cost to the manufacturer of the printer and embossing devices as well as being expensive in computational resources.

SUMMARY

In one of various possible embodiments, a method of providing printing and embossing data includes transmitting print image data defining an image to be printed and emboss image data defining an image to be embossed, where the data is transmitted over a single data path to a common recipient processor.

In another embodiment, a system for producing printed and embossed materials includes a host device outputting print image data and emboss image data, a printing device in communication with the host device, and an embossing device in communication with the printing device. The host device transmits both the print image data and the emboss image data over a single data path.

In another embodiment, a printing device includes a communications port for receiving data from a host device, a print engine for printing a print image based on data from the host device, and a controller for processing data from the host device for use by the print engine. The controller is programmed to separate print image data from emboss image data received from the host device, and process the emboss image data for use by an embossing device.

In another embodiment, an embossing device includes a control unit programmed to receive emboss image data from a printing device and emboss a print medium in accordance with the emboss image data received from the printing device.

In another embodiment, a processor-readable medium contains processor-readable instructions for a controller of a printing device. The instructions, when executed, cause the controller to: receive print image data and emboss image data, process the print image data and the emboss image data, and transmit the emboss image data to an embossing engine.

In another embodiment, a computer-readable medium contains computer-readable instructions which, when executed, cause a computer to transmit print image data and emboss image data to a printing device over a single data path.

BRIEF DESCRIPTION OF THE DRAWINGS

The accompanying drawings illustrate embodiments of the present invention and are a part of the specification. The illustrated embodiments are merely examples of the present invention and do not limit the scope of the invention. Like reference numerals refer to similar, though not necessarily identical, elements in the accompanying drawings.

DETAILED DESCRIPTION

An apparatus and method are described herein for using a single downloading path to transmit data for both printed and embossed images to a printing/embossing device. The printed and embossed images may be identical or different.

In the following description, for purposes of explanation, numerous specific details are set forth in order to provide a thorough understanding of the described embodiments. It will be apparent, however, to one skilled in the art that not all such details need be included in any particular embodiment. Reference in the specification to "one embodiment" or "an embodiment" means that a particular feature, structure, or characteristic described in connection with the embodiment is included in at least one embodiment of the invention. The appearance of the phrase "in one embodiment" in various places in the specification are not necessarily all referring to the same embodiment.

For ease of explanation only, the following description will be developed within the context of a printing/embossing device that combines a laser printer with a dot matrix embossing device.

Exemplary Overall Structure

Figure 1:
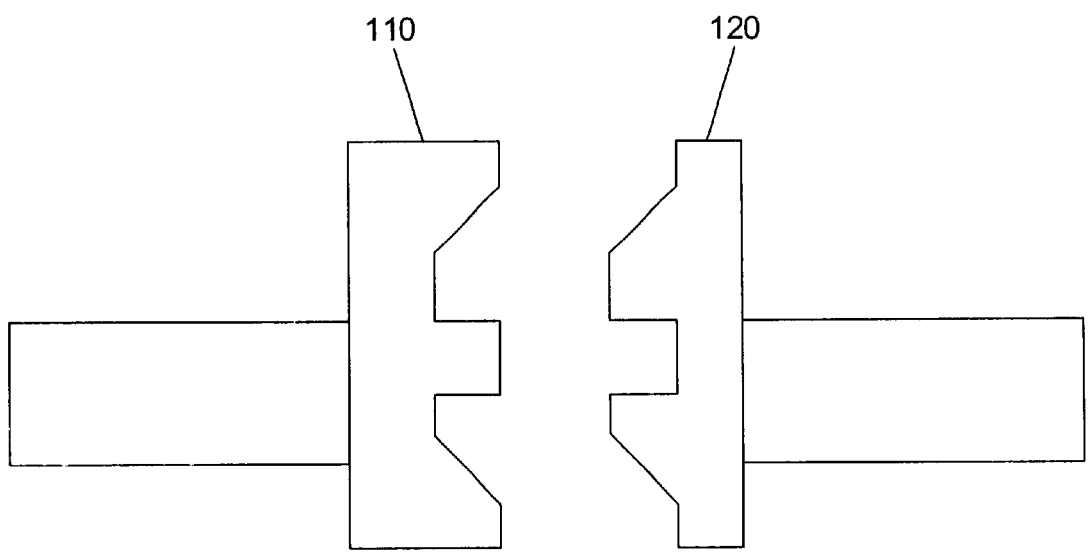
FIG. 1 illustrates an embodiment of a prior art embossing device.
Figure 2:
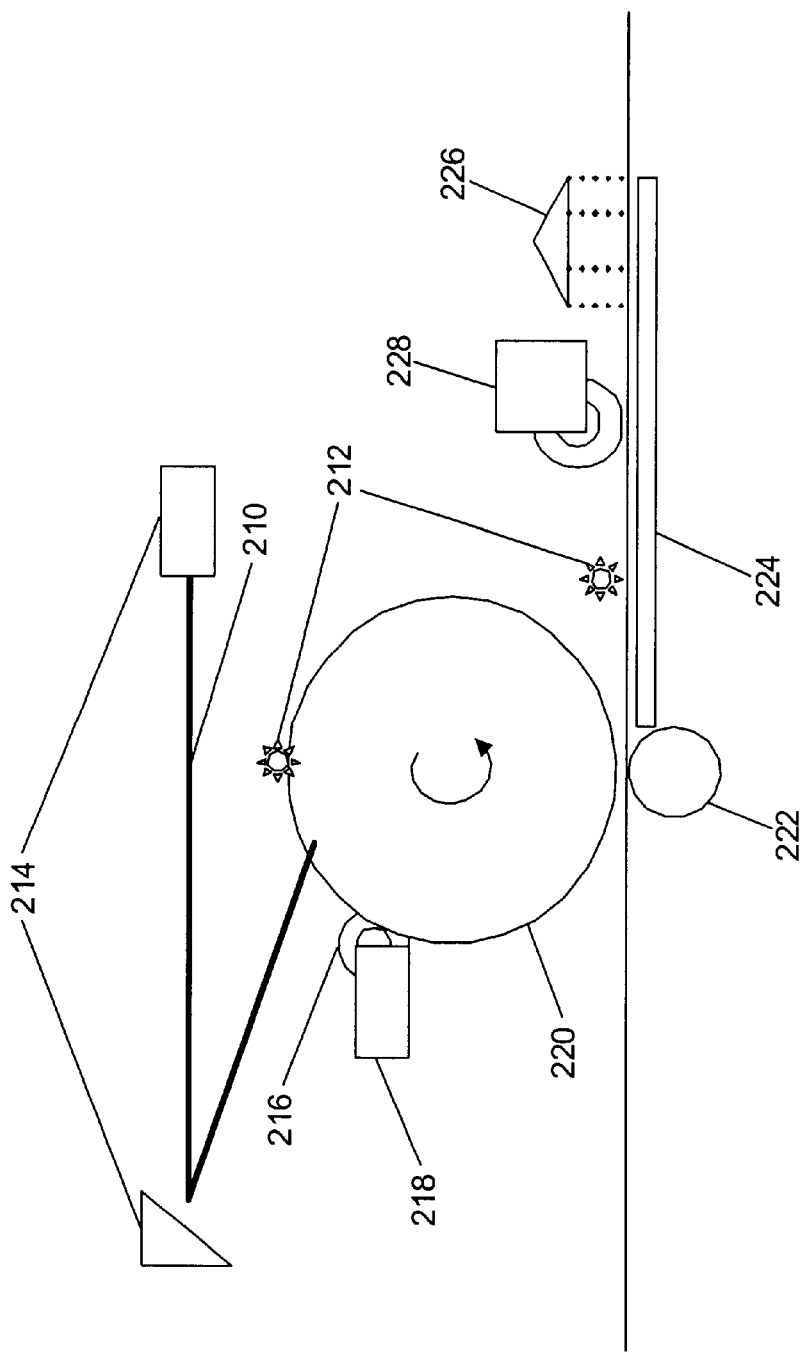
FIG. 2 illustrates another prior art embossing device.
Figure 3:
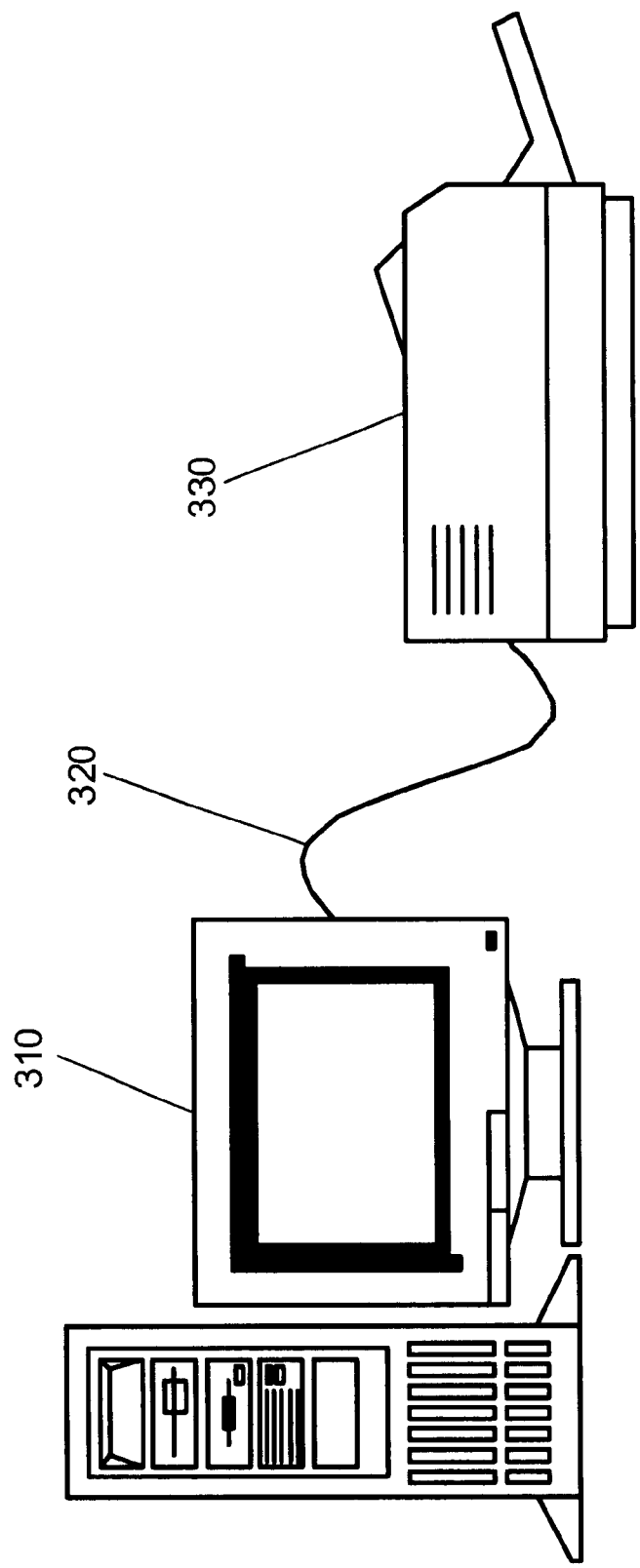
FIG. 3 illustrates a communications set up for transmitting an embossing image according to one embodiment of the present invention.

FIGS. 3, 4a, 4b and 4c illustrate the principal components of an exemplary embodiment of a printing/embossing system. FIG. 3 illustrates a system that includes a host device (310), a printing/embossing device (330) and the communications arrangement between the host device (310) and the printing/embossing device (330).

As shown in FIG. 3, a single downloading or communications path (320) communicatively couples the host (310) and the printing/embossing device (330). The communications path (320) shown in FIG. 3 may be a parallel port cable, Ethernet cable or a Universal Serial Bus (USB) cable. However, it will be understood that any other wired or wireless communication device capable of transmitting data from the host (310) to the printing/embossing device (330) may be used.

As will be explained below, the host device (310), for example, a personal computer or server, is used to generate or store data the defines either or both of a print image and an emboss image. The host (310) transmits that data to the printing/embossing device (330) using the communications path (320). The printing/embossing device (330) then uses the data to generate, in hardcopy form, the printed and/or embossed images on a print medium.

Figure 4A:
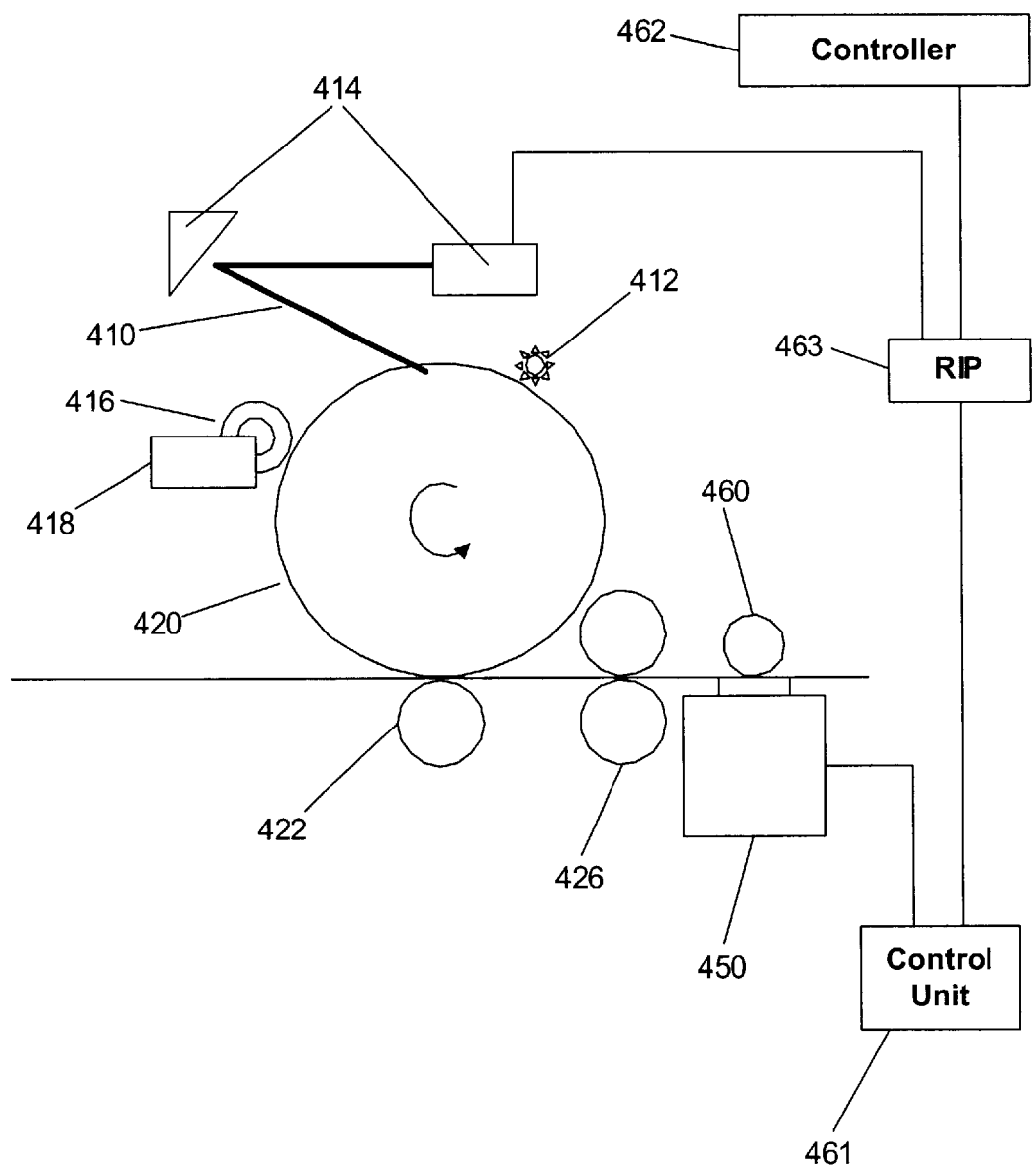
FIG. 4a illustrates a printing/embossing device according to one embodiment of the present invention.

The printing/embossing device (330) will now be described in more detail. FIG. 4a illustrates one embodiment of a printing/embossing device. The printer portion of the printing/embossing device preferably includes a laser print engine. This print engine is composed of a number of components arranged around a cylindrical imaging drum. For example, a corona wire (412), a laser-scanning unit (414), a developer cylinder (416), a toner supply (418), and a print transfer roller cylinder (422) are all located adjacent to the drum (420).

The corona wire (412) places a field of electric charges over the surface of the drum (420). A laser (410) of the laser-scanning unit (414) is scanned and modulated according to the print data so as to write a latent image corresponding to the print data in the charges formed by the corona wire (412) on the surface of the drum (420). The latent image is then developed by applying toner from the toner supply (418) with the developing roller (416). Due to electrostatic forces, toner will adhere to the drum (420) only over the latent image written by the laser (410). The transfer roller (422) then transfers the toner image from the drum (420) to a print medium, such as a sheet of paper. A fuser (426) then fuses the toner image to the print medium thereby forming a printed image.

Subsequent to the fuser (426), the embossing portion of the printing/embossing device (330) begins. The embossing portion of the printing/embossing device is similar to a dot-matrix print head, without an ink ribbon. The embossing portion includes an embossing shuttle (450) and a platen (460), preferably in the form of a cylindrical roll. The shuttle (450) includes a dot-matrix type head. The dot-matrix type head is preferred due to its ability to use rasterized data to form an image on a print medium.

During embossing operations, the shuttle (450) is moved laterally, back and forth along the platen (460) and across a print medium that is placed between the shuttle (450) and the platen (460). As will be described in more detail below, as the shuttle (450) moves over the surface of the print medium, the shuttle (450) punches an embossed image into the print medium using embossing pins.

Figure 4B:
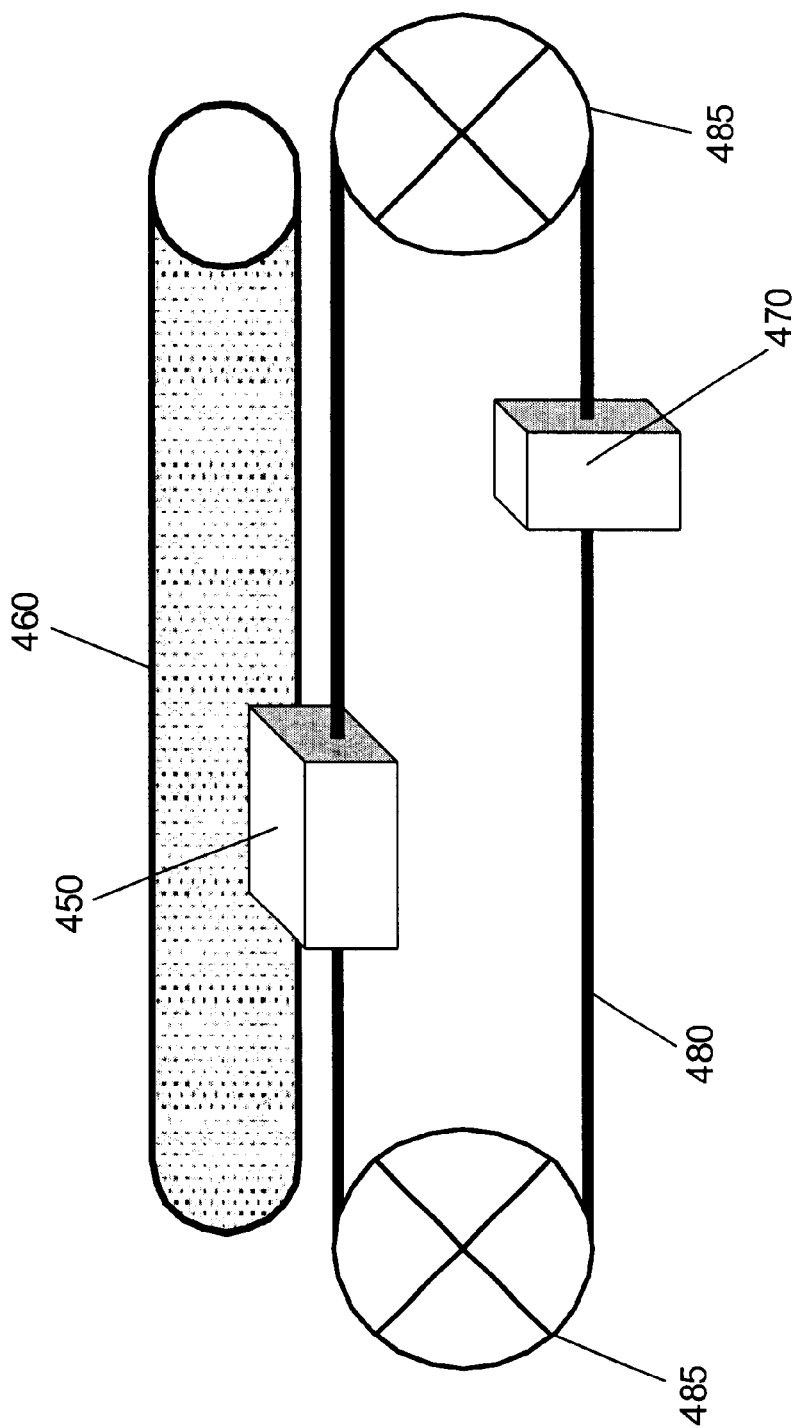
FIG. 4b illustrates an embossing device according to one embodiment of the present invention.

There are a number of possible mechanisms for moving the shuttle (450) along the platen (460) and over a print medium. FIG. 4b illustrates one possible embodiment of the embossing portion of the printing/embossing device. As shown in FIG. 4b, the embossing shuttle (450) may be attached to a shuttle belt (480). The shuttle belt is linearly controlled by a pair of driven belt rollers (485) located at each end of the shuttle belt (480). The belt rollers (485) are selectively rotated to translate the embossing shuttle (450) along the platen (460). A counter balance (470) is preferably located on the shuttle belt (480) opposite the embossing shuttle (450) to offset any dynamic vibrations that may be caused by the movement of the embossing shuttle (450).

Alternatively, the shuttle (450) could be mounted on a shaft that runs along the platen (460). A motor could then be used a drive either the shuttle (450) or the shaft so as to translate the shuttle (450) along the length of the platen (460). In some embodiments, a permanent magnet may be placed on the shuttle (450) that is moveably mounted on a shaft. The shuttle is then driven magnetically, for example, by electromagnetic coils, along the shuttle shaft that runs parallel to the platen (460). Any device for moving the shuttle (450) linearly along the platen (460) may be used.

Figure 4C:
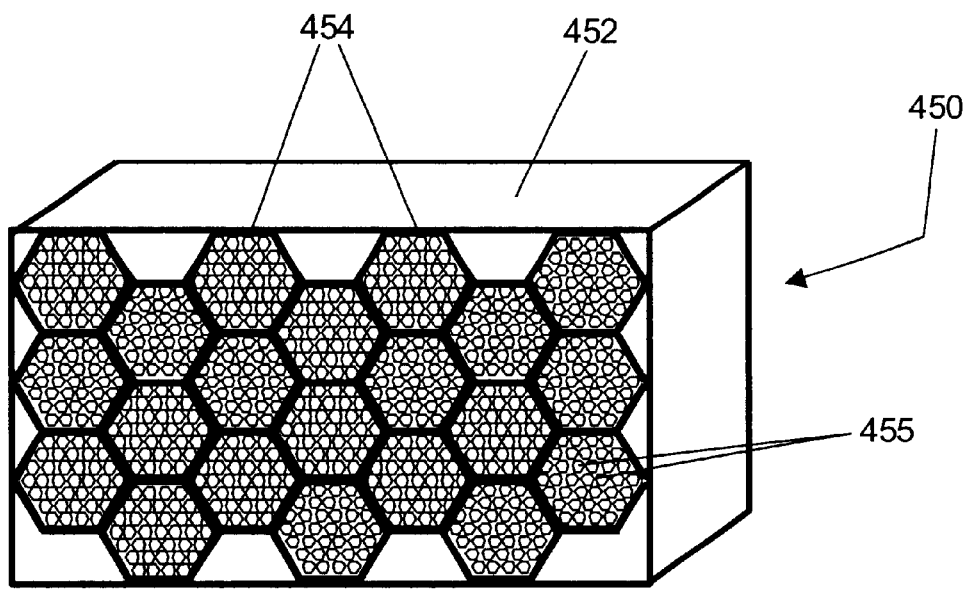
FIG. 4c illustrates an embossing structure according to an embodiment of the present invention.

FIG. 4c shows a frontal view of one embodiment of the embossing shuttle (450). The shuttle is preferably made of a shuttle frame (452) and embossing units (454). As illustrated in FIG. 4c, the embossing units (454) each contain a number of embossing pins (455). The embossing pins (455) are cylindrically shaped pins or wires that are used to selectively impact a print medium thereby producing an embossed image.

The embossing pins (455) illustrated in FIG. 4c are each connected to a drive mechanism (not shown) such as a release mechanism or a small electromagnetic solenoid that is capable of selectively driving each embossing pin (455) out of the embossing unit (454) toward the platen (460, FIG. 4b) when activated by the control unit (461, FIG. 4a). A print medium that is to be embossed is placed between the shuttle (450) and the platen (460, FIG. 4b). As the shuttle (450) is translated over the print medium, the control unit (461, FIG. 4a) selectively fires the embossing pins toward areas of the print medium designated by rasterized emboss data. The impact of the embossing pins (455) against the platen (450) embosses the print medium with a desired image. This embossing operation will be described in further detail below.

Exemplary Implementation and Operation

In a traditional printing device, the host computer (310, FIG. 3) describes a print image in a Printer Command Language (PCL) or a Page Description Language (PDL). The data for the print image specifies where toner should be laid down on a print medium to yield a desired printed output. In order to perform an additional function such as embossing, a secondary downloading path was traditionally required to transmit data for an emboss image to an external embossing device. The format of the data for the emboss image would have been dictated by the specifics of the embossing device.

Figure 5:
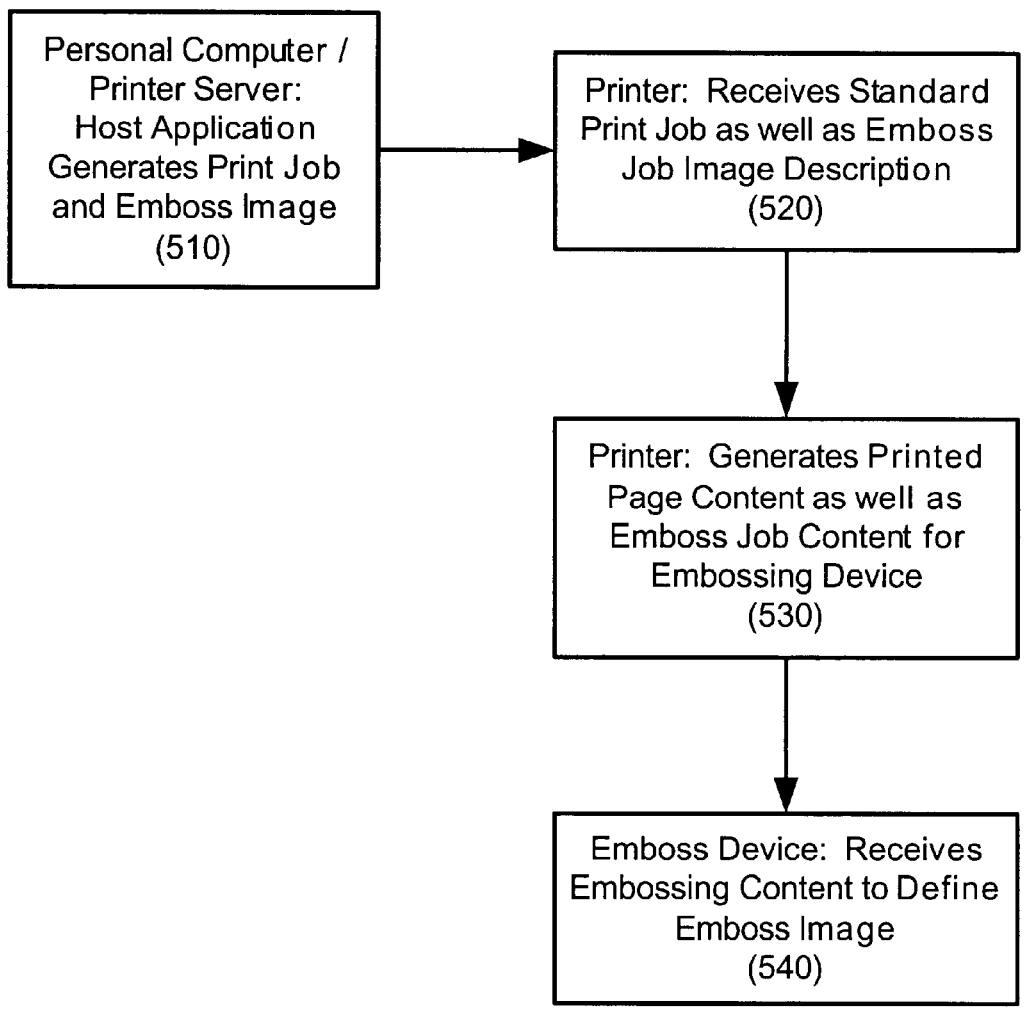
FIG. 5 illustrates a printing/embossing job according to an embodiment of the present invention.

FIG. 5 illustrates a method for using a printer's single downloading path to provide emboss image data to an embossing device that is connected to a printing device or incorporated into a single printing/embossing device. First, the host computer (310, FIG. 3) runs an application that generates or retrieves data for either or both a print image and an emboss image (step 510). Second, the data for the print image and/or the emboss image are transmitted over a single downloading path and received in the printing/embossing device (step 520). Third, the printing/embossing device generates print image content and emboss image content (step 530). This may be done by rasterizing the PCL or PDL data to generate rasterized print and/or emboss data that can be used directly by the print engine or embossing engine, respectively, of the printing/embossing device.

At this point, the rasterized print image data may be sent to the device's print engine and printed on a sheet of print medium. Lastly, the rasterized emboss image data is sent to the embossing portion of the printing/embossing device (step 540). The embossing engine will then use the rasterized emboss image data to emboss the desired image on the sheet of print medium. It should be noted that in any given instance, there might be only a printed image or only an embossed image rendered on the print medium. It is not necessary to every job include both a printed image and an embossed image.

Host Application Generates Print Image and an Emboss Image

Figure 6:
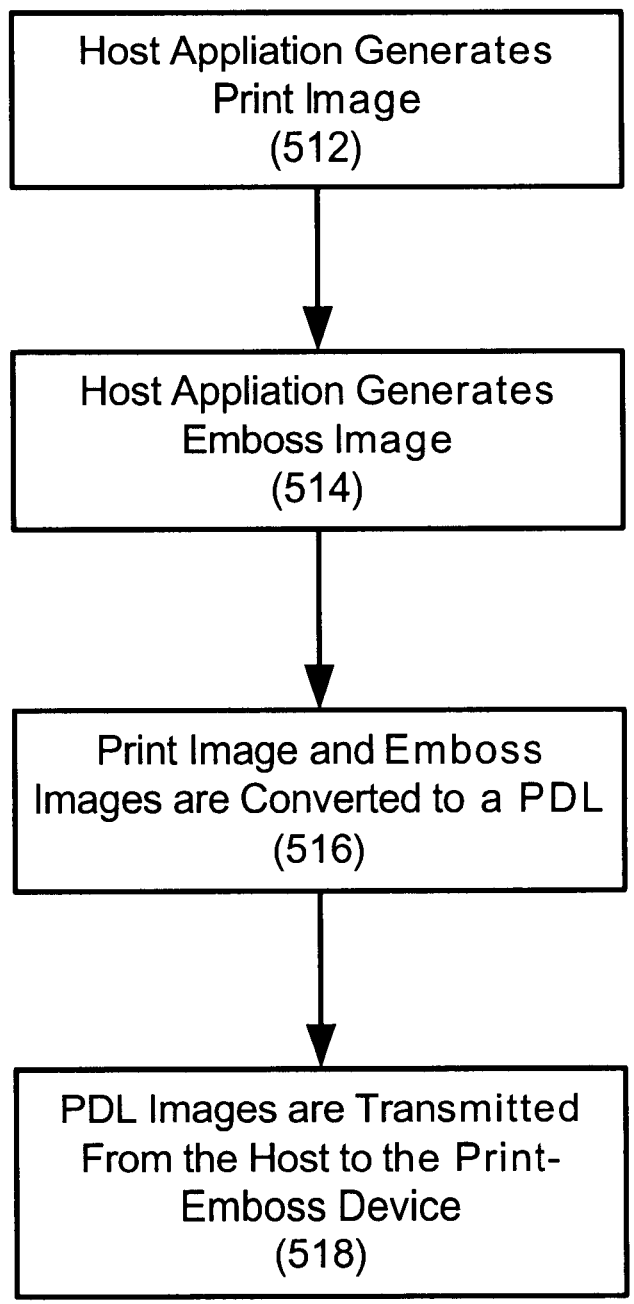
FIG. 6 illustrates the workings of the host application according to an embodiment of the present invention.

FIG. 6 illustrates how one embodiment employs an application running on a personal computer, printer server, or another electronic device acting as the host (310, FIG. 3) to generate a print image and/or an emboss image (step 510, FIG. 5). A host application such as a word processor or graphic design application is used to generate data for a print image (step 512). The print image is the image to be printed, for example, with ink or toner, on a print medium. Print image data is to be understood both here and in the appended claims as data used to specify where the ink or toner should be laid down on a print medium to yield a desired printed output.

The print image data is prepared for transmission to the printing/embossing device by converting the print image data into a page description language (PDL) or Printer Command Language (PCL) (step 516). These languages typically describe the printed page in vector form— mathematical values of geometric shapes, rather than as a series of dots. The PDL may include complex information including any number of different fonts or graphics.

Once the print image is described in an appropriate language (step 516), but before being sent to the printing/embossing device, the emboss image data is also generated and prepared for production (step 514) by a host application such as a word processor or a graphic design application running on the host computer. The emboss image is the image that is to be embossed into or on the print medium. Emboss image data is to be understood both here and in the appended claims as data that defines the pattern of the portions of the print medium that will be raised or embossed. It will be understood by one of skill in the art that the print image data and emboss image data may be generated in any order.

In a similar manner as described above, the emboss image data is converted to a PDL or PCL (step 516) and packaged for transmission along with the print image data (step 518). Preferably, when the print and emboss image data are packaged for transmission (step 518), included in the transmission is a header containing information describing what data represents the print image and what data represents the emboss image.

Print Image and the Emboss Image are Transmitted to the Printing/Embossing Device Once the print image data and the emboss image data are in an appropriate form, the data is transmitted together from the host (310, FIG. 3) to the controller of the printing/embossing device (330, FIG. 3) through a single communications path (320, FIG. 3). Communications paths (320, FIG. 3) may include but are not limited to a parallel port, a USB port, or any other wired or wireless communication device.

Figure 7:
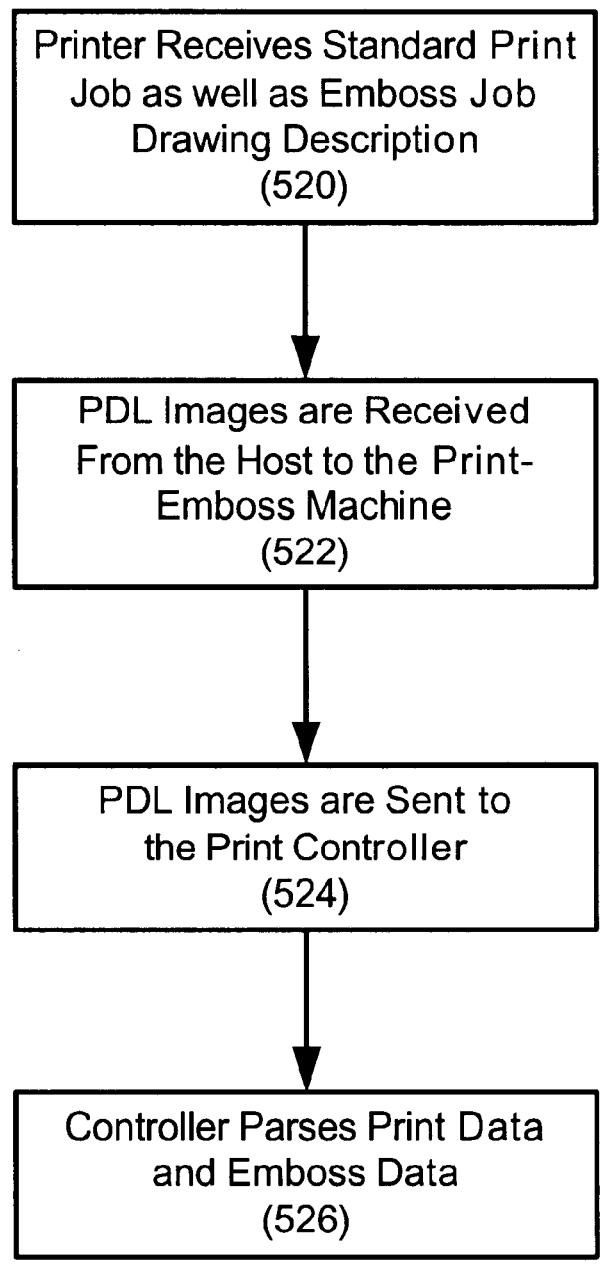
FIG. 7 is an example of a data transfer process according to an embodiment of the present invention.

FIG. 7 illustrates that when the print and emboss image data is received at the printing/embossing device (step 522), the data associated with the print image and the emboss image are sent to the print controller (step 524). Once received in the print controller, the packaged print image data and emboss image data are parsed or rasterized into data that can be submitted to the print engine or embossing engine as described above (step 526).

The printing/embossing device includes firmware for controlling operation of the printing/embossing device and for parsing the print image data and/or emboss image data. As part of the parsing process (step 526), the firmware receives the print and emboss image data and makes a determination, based at least in part on the header information, which data represents the print image and which represents the emboss image. Parsing (step 526) then concludes with the conversion of the data into a form useable by the respective print and embossing engines, e.g., rasterization.

Figure 8:
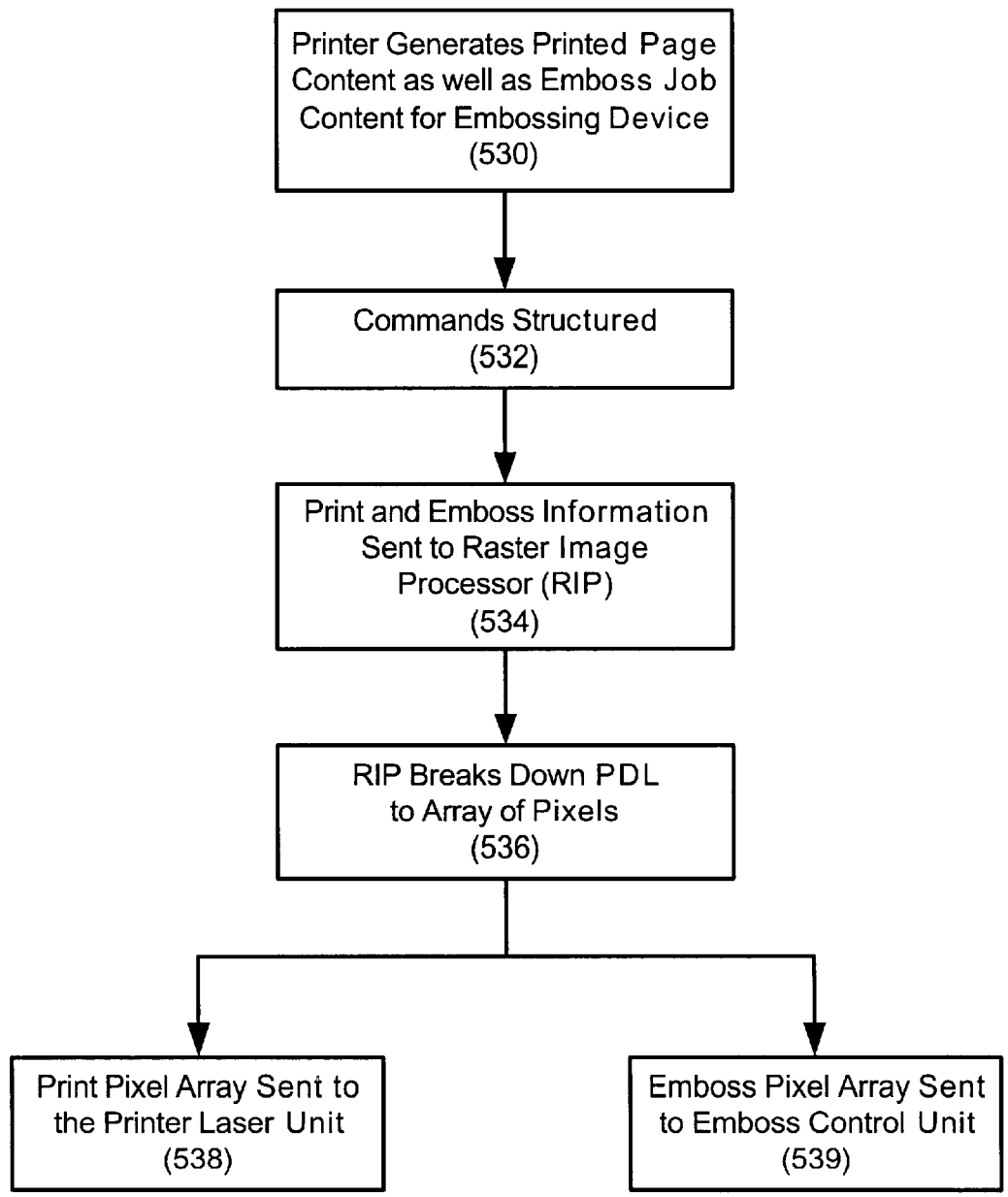
FIG. 8 illustrates the data process according to one embodiment of the present invention.

Printer Generates Printed Page Content and Emboss Job Content for Embossing Device FIG. 8 illustrates that the print image data is identified and separated from any emboss image data (step 530). The PDL or PCL commands are then structured (step 532), and the controller (462, FIG. 4a) begins preparing the data for use by the print engine and embossing engine, respectively. The controller sets the text margins, arranges the words, and places any printed graphics in their place within the page to be printed. When the page is arranged, the print image data is sent to the raster image processor (RIP) for rasterization (step 534). The RIP (463, FIG. 4a) takes the print page data, either as a whole or piece by piece, and breaks it down into an array of tiny dots or pixels (step 536).

Likewise, the controller (462, FIG. 4a) also takes the corresponding emboss image data for the respective print medium and structures the emboss image (step 532) by, for example, setting the margins and placing the embossed elements within the page to be embossed. When the emboss image is arranged, the data is likewise sent to the RIP (step 534) to be rasterized, i.e., broken down into an array of pixels (step 536). When both the print image data and the emboss image data are rasterized, the rasterized data is transmitted (step 538) respectively to the print engine, e.g., the print laser-scanning unit (414, FIG. 4a), and the embossing engine, e.g., the emboss control unit (461, FIG. 4a) and embosser (450, 460, FIG. 4a) (steps 538 and 539).

Referring again to FIG. 4a, the print laser-scanning unit (414) receives the rasterized print image data one horizontal line at a time from the RIP (463). As the print laser-scanning unit (414) receives the rasterized data, it emits a pulse of light (410) for every dot to be printed and no pulse for every dot of empty space. In this manner the print laser-scanning unit forms a latent image on the drum (420), as described above. As the drum (420) rotates, charged toner is applied and adheres to the electrostatic latent image formed on the surface of the drum (420) from which the like charge has been dissipated. The toner is repelled by other portions of the drum (420) where a like charge remains. In this way, a toner image is formed on the drum (420). As the drum (420) rotates, charged toner is applied to the entire latent image on the surface of the drum (420) by the developer cylinder (416). This fully develops the latent image on the drum (420).

Additionally, as the drum (420) rotates, sheets of print media from a supply of print media are sequentially delivered to a pair of resist rollers (not shown). The paired resist rollers are rotated at a timing so adjusted to make a leading edge of a sheet of print medium register with the image on the drum (420).

The print medium is then delivered to a transfer nip between the drum (420) and a print transfer roller (422). As the print medium passes between the drum (420) and the print transfer roller (422), the print medium is charged, for example to at least 1000 V, to efficiently transfer the toner of the developed image to the print medium (e.g., paper) and to hold the toner onto the print medium until it is fused. A toner image on the drum (420) is then transferred to the print medium by the print transfer roller (422). After receiving the image transferred from the drum (420), the print medium is conveyed to a fuser (426) where the toner image is fixed to the print medium by heating.

Emboss Device Receives Embossing Content to Define Emboss Image

As the print image is being formed, the emboss control unit (461) receives the rasterized emboss image data from the RIP (463). Preferably, the embossing engine functions like a dot matrix printer, without an ink ribbon. Referring now also to FIGS. 4b and 4c, when a print medium has received its print image, the print medium is transported to the embossing section of the printing/embossing device (330, FIG. 3).

The movement of the embossing shuttle (450) is synchronized with the fuser (426, FIG. 4a) to cause a leading edge of the print medium to register with the first line of the rasterized emboss image data. The embossing shuttle (450) is controlled by the emboss control unit (461, FIG. 4a).

As the print medium is advanced line by line between the emboss shuttle (450) and the platen (460), the control unit (461, FIG. 4a) causes the embossing units (454, FIG. 4c) located on the emboss shuttle (450) to selectively fire small embossing pins (455, FIG. 4c) at the print medium. The embossing pins (455) are preferably small cylindrical or rounded pins that may be selectively fired outwardly from the emboss shuttle (450) towards the print medium using, for example, a release mechanism or small solenoids. The control unit causes a pin to be fired at locations on the print medium that correspond to embossed areas as identified by the rasterized emboss image data. Similarly, the control unit causes no pin to be fired for every dot of unembossed space according to the rasterized emboss image data.

When the embossing pins (455, FIG. 4c) strike the print medium, the print medium is pushed towards the platen (460). The fibers of the print medium are stretched where an embossing pin (455, FIG. 4c) strikes. In this manner, the embossing device forms a raised, embossed image on the print medium that corresponds to the emboss image data. The depth of the emboss image is determined by the gap between the embossing units (454) and the platen (460). The gap may be determined and selectively adjusted by a user or by the emboss control unit (461). This determination depends on the thickness of the print medium to be used and the desired depth of the embossed image.

The present design eliminates the problem of needing multiple downloading paths to transfer different print image and emboss image data from a host device to a printing/embossing device. As described herein, the embossed image can be both downloaded and created as easily as the printed image. Additionally, the configuration disclosed improves the ability of the print apparatus and the embossing apparatus to communicate and allows timing issues to be resolved in order that the embossed image may be accurately located with respect to the printed image.

Moreover, by providing and rasterizing separate print and emboss images, the print image and the emboss image can be different. Thus, the user has complete flexibility to design a printed and embossed product.

Alternative Embodiments

Figure 9:
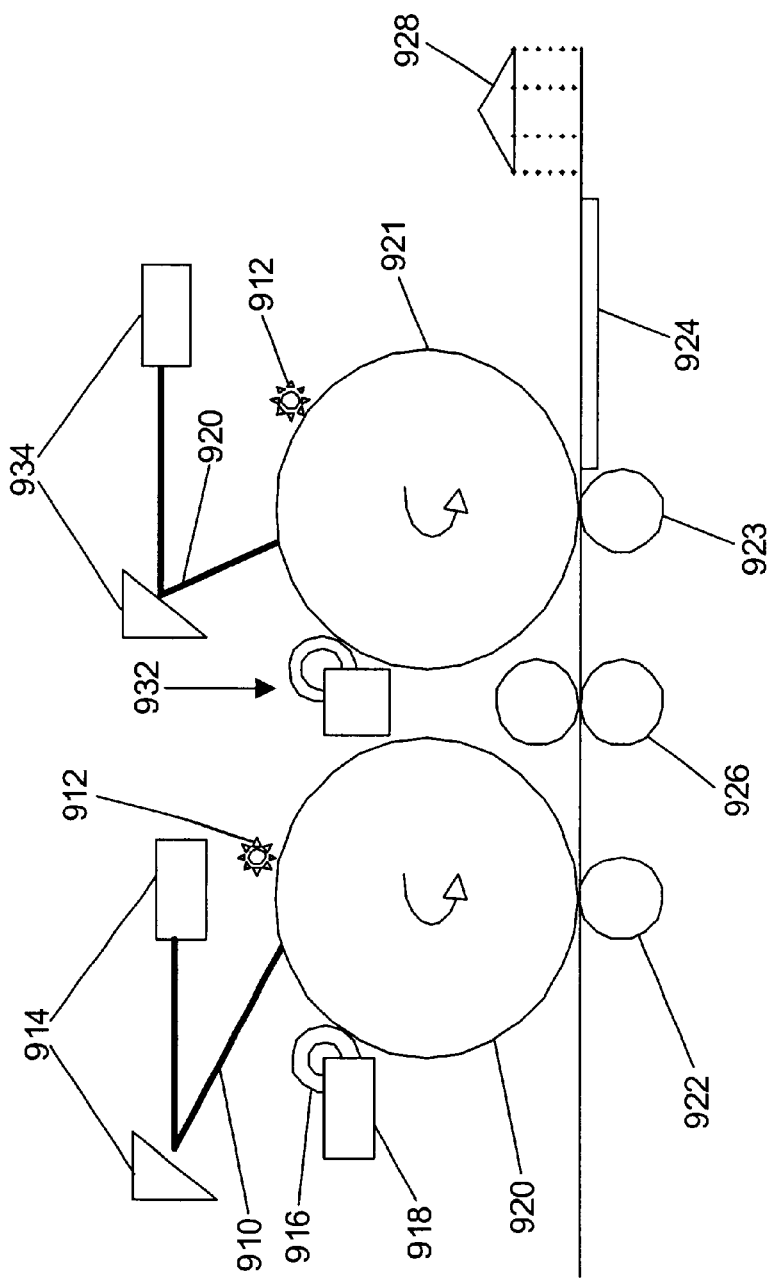
FIG. 9 demonstrates one alternative embodiment of a printing/embossing device according to the teachings of the present invention.

An alternative embodiment can be seen in FIG. 9. As shown in FIG. 9, the embossing engine may produce the emboss image using a drum (921) on which an electrostatic latent image is formed in the same manner as is done when producing printed image in the laser print engine described above.

A corona wire (912) is located in proximity to an emboss image drum (921). The corona wire (912) places a field of charge on the drum (921). A laser-scanning unit (934) then uses rasterized emboss image data to write a latent emboss image in the charged on the drum (921) using a modulated scanning laser. Similar to the method described above, the emboss laser-scanning unit emits a pulse of light (934) for every dot to be embossed and no pulse for every dot of unembossed space. In this manner the embossing device forms a latent image on the drum (921) that corresponds to the emboss image.

A polyamide resin developer cylinder (932) applies a resin to develop the latent image on the drum (921). As the drum (921) rotates, a charged polyamide resin powder from the polyamide resin developer cylinder (932) adheres to the electrostatic latent image formed on the surface of the drum (921) from which the like charge has been dissipated. The resin powder is repelled by other portions of the drum (921) where a like charge remains. In this way, the image is formed on the drum (921) with polyamide resin powder. The thickness of the layer of polyamide resin powder varies according to the amount of electric charge in the electrostatic latent image and the particle size of the polyamide resin powder.

Continued rotation of the drum (921) is synchronized with the fuser (926) to cause a leading edge of the print medium coming from the printing portion of the device to register with the polyamide resin image on the drum (921). An emboss transfer roller (923) then transfers the resin image to the print medium from the drum (921). A transport path (924) then transports the print medium to a curing device, for example, an infrared heater (928), to heat the polyamide resin affixing it to the print medium and creating the desired embossed image on the print medium.

Figure 10:
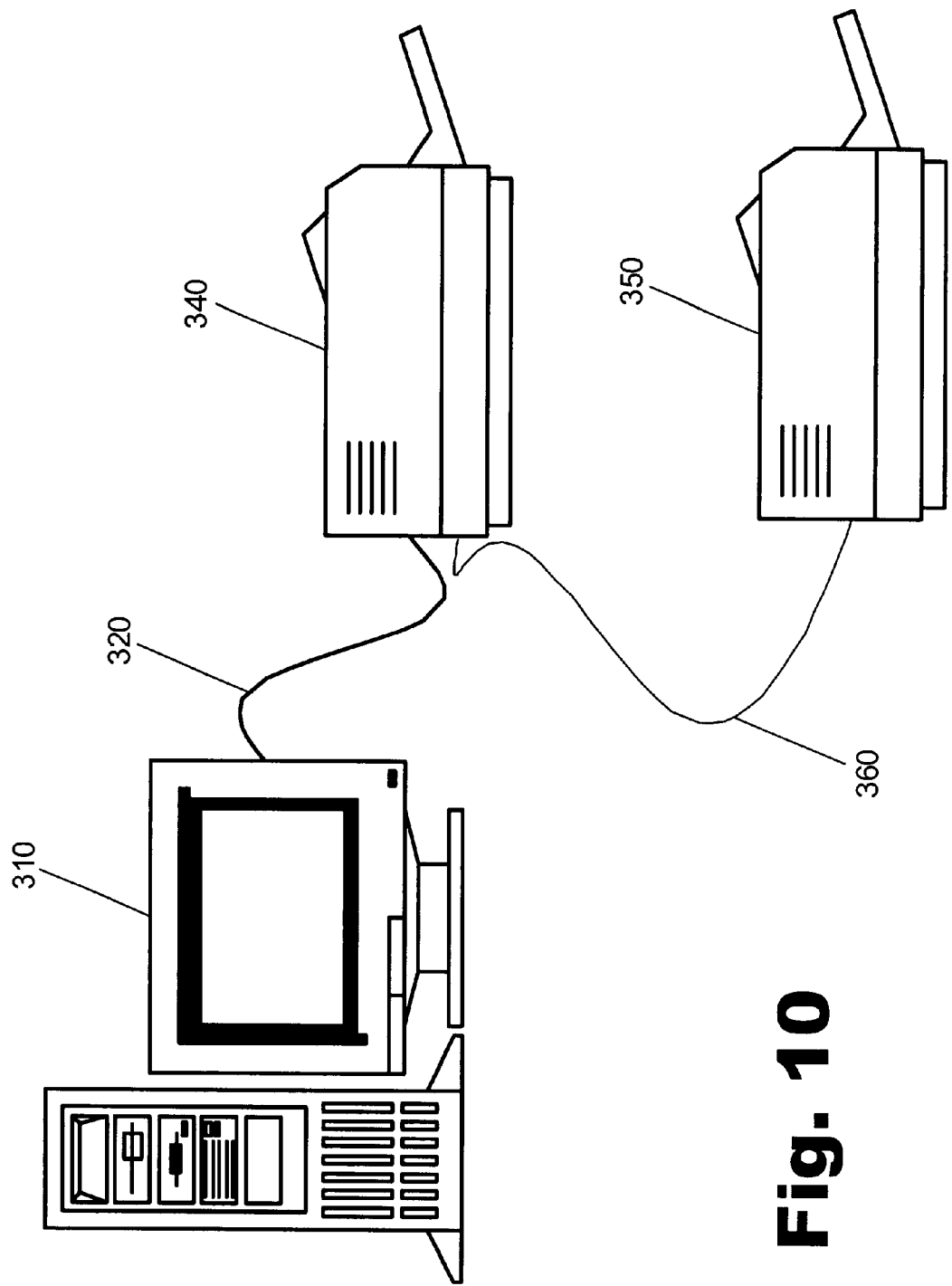
FIG. 10 illustrates an alternative system with separate embossing and printing devices according to another embodiment of the present invention.

As illustrated in FIG. 10, an additional embodiment of the present invention may include a host device (310) and separate printing (340) and embossing (350) devices. The host device (310) is communicatively coupled (320) with the printing device (340), and the printing device (340) is communicatively coupled (360) to the embossing device (350).

According to this embodiment, the host computer (310) still generates the print image and the emboss image to be produced. The images are still converted to a PDL or PCL and transmitted to the print controller in the printing device (340). Once the information is at the print controller, it is sent to the RIP and rasterized. The print controller produces rasterized print image data and rasterized emboss image data.

The rasterized emboss image data is then sent to the embossing device (350). The printing device (340) and embossing device (350) are communicatively coupled (360) using any means, wired or wireless, of transmitting data. When the embossing device (350) receives the rasterized emboss image data, that data is held in the spool until the already printed print medium output by the printing device (340) and inserted into the embossing device (350). The embossing device (350) recognizes the initial edge of the print medium to be embossed, and registers the embossed image properly on the print medium.

It will be understood that the methods and system described herein can be implemented with a wide variety of printing and embossing devices. With the printing device incorporating, or being communicatively coupled to, the embossing device, a single data path may be used to provide both print image data and the emboss image data. In this manner, by communicatively coupling both the printing device and the embossing device, the printer controller can manipulate all the data to control both devices.

The preceding description has been presented only to illustrate and describe the invention. It is not intended to be exhaustive or to limit the invention to any precise form disclosed. Many modifications and variations are possible in light of the above teaching. It is intended that the scope of the invention be defined by the following claims.

What is claimed is:

1. A system for producing printed and embossed materials, comprising:

a host device for outputting print image data and emboss image data;

a printing device in communication with said host device; and an embossing device in communication with said printing device;

wherein said host device is configured to transmit both said print image data and said emboss image data over a single data path.

2. The system of claim 1, wherein said embossing device and said printing device are integrated into a single unit.

3. The system of claim 1, wherein said printing device is connected by a wired connection to said host device.

4. The system of claim 1, wherein said printing device and said embossing device are separate units connected by a wired connection.

5. The system of claim 1, wherein said printing device comprises a laser print engine.

6. The system of claim 1, wherein said embossing device comprises an embossing shuttle configured to selectively fire embossing pins into a print medium backed by a platen to emboss the print medium.

7. The system of claim 6, further comprising a mechanism for moving said embossing shuttle over a surface of said print medium.

8. The system of claim 7, wherein said mechanism comprises a driven belt on which said shuttle is mounted.

9. The system of claim 8, further comprising a counter balance mounted on said belt.

10. The system of claim 7, wherein said mechanism comprises a shaft along which said shuttle is driven.

11. The system of claim 1, wherein said embossing device comprises:

a charged drum on which a latent emboss image is written according to said emboss image data;

a developer for developing said latent image by applying a resin to said latent image;

a transfer roller for transferring a resin image from said drum to a print medium; and a curing device for curing said resin image on said print medium to form a corresponding embossed image on said print medium.

12. The system of claim 11, wherein said curing device is an infrared heater.

13. The system of claim 1, wherein said printing device processes said print image data and said emboss image data and provides processed emboss image data to said embossing device.

14. The system of claim 1, wherein said printing device comprises a raster image processor configured to rasterize said print image data and said emboss image data, wherein rasterized emboss image data is provided to said embossing device.

15. A method of providing printing and embossing data, comprising transmitting print image data defining an image to be printed and emboss image data defining an image to be embossed, wherein said data is transmitted over a single data path to a common recipient processor.

16. The method of claim 15, wherein said transmitting is performed by a host device.

17. The method of claim 15, wherein said recipient processor is a controller in a printing device.

18. The method of claim 17, further comprising processing said print image data and said emboss image data in said printing device.

19. The method of claim 18, wherein said processing comprises rasterizing said print image data and said emboss image data.

20. The method of claim 19, further comprising transmitting rasterized emboss image data to an embossing device.

21. The method of claim 15, further comprising inserting a header into a transmission of print image data and emboss image data, said header identifying which data is said print image data and which is said emboss image data.

22. The method of claim 15, further comprising:

generating said print image data representing a print image; and generating said emboss image data representing an emboss image;

wherein said print image is different from said emboss image.

23. A system for providing printing and embossing data, comprising:

means for generating print image data and emboss image data; and means for transmitting said print image data defining an image to be printed and said emboss image data defining an image to be embossed over a single data path to a common recipient processor.

24. A computer-readable medium containing computer-readable instructions, wherein said instructions, when executed, cause a computer to transmit print image data and emboss image data to a printing device over a single data path.

25. The medium of claim 24, wherein said instructions further cause said computer to translate said print image data and said emboss image data in a page description language prior to transmission to the printing device.

\* \* \* \* \*